(12) United States Patent
Yamawaki et al.

(10) Patent No.: US 10,256,457 B2
(45) Date of Patent: Apr. 9, 2019

(54) SECONDARY BATTERY

(71) Applicant: Sanyo Electric Co., Ltd., Daito-shi, Osaka (JP)

(72) Inventors: Takuya Yamawaki, Hyogo (JP); Eiji Okutani, Hyogo (JP); Masakazu Yamada, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 235 days.

(21) Appl. No.: 15/214,773

(22) Filed: Jul. 20, 2016

(65) Prior Publication Data

US 2017/0025667 A1    Jan. 26, 2017

(30) Foreign Application Priority Data

Jul. 21, 2015  (JP) ................. 2015-143912

(51) Int. Cl.

| H01M 2/06 | (2006.01) |
|---|---|
| H01M 2/26 | (2006.01) |
| H01M 2/34 | (2006.01) |
| H01M 10/0525 | (2010.01) |
| H01M 10/0587 | (2010.01) |

(52) U.S. Cl.
CPC ............ *H01M 2/345* (2013.01); *H01M 2/06* (2013.01); *H01M 2/263* (2013.01); *H01M 10/0525* (2013.01); *H01M 10/0587* (2013.01)

(58) Field of Classification Search
CPC .................................... H01M 2/06
See application file for complete search history.

(56) References Cited

U.S. PATENT DOCUMENTS

| 2008/0038627 A1 | 2/2008 | Yamauchi et al. |
|---|---|---|
| 2008/0038628 A1 | 2/2008 | Yamauchi et al. |
| 2010/0233529 A1 | 9/2010 | Nansaka et al. |
| 2013/0067727 A1 | 3/2013 | Nansaka et al. |
| 2013/0067728 A1 | 3/2013 | Nansaka et al. |
| 2013/0095352 A1 | 4/2013 | Yamauchi et al. |

(Continued)

FOREIGN PATENT DOCUMENTS

| JP | 2008-66254 A | 3/2008 |
|---|---|---|
| JP | 2008-66255 A | 3/2008 |

(Continued)

*Primary Examiner* — Maria Laios
(74) *Attorney, Agent, or Firm* — Westerman, Hattori, Daniels & Adrian, LLP

(57) ABSTRACT

A conductive member including an opening portion is connected to a positive terminal and is integrally secured to a sealing plate together with an outer insulating member and a second insulating member. The conductive member opening portion is sealed by a deformable plate. A base portion of a positive electrode current collector is connected to the deformable plate. A first insulating member that is disposed between the deformable plate and the base portion of the positive electrode current collector includes a pair of first catch portions that are disposed so as to be aligned in a longitudinal direction of the sealing plate and a pair of second catch portions that are disposed so as to be aligned in a transverse direction of the sealing plate. The first catch portions and the second catch portions are connected to the second insulating member disposed between the sealing plate and the conductive member.

17 Claims, 7 Drawing Sheets

(56) References Cited

U.S. PATENT DOCUMENTS

| | | | |
|---|---|---|---|
| 2013/0196185 A1 | 8/2013 | Yokoyama et al. | |
| 2013/0196220 A1* | 8/2013 | Okutani | H01M 2/0217 |
| | | | 429/179 |
| 2015/0303443 A1 | 10/2015 | Yokoyama et al. | |

FOREIGN PATENT DOCUMENTS

| | | |
|---|---|---|
| JP | 2010-212034 A | 9/2010 |
| JP | 2013-157099 A | 8/2013 |
| JP | 2013-175428 A | 9/2013 |

* cited by examiner

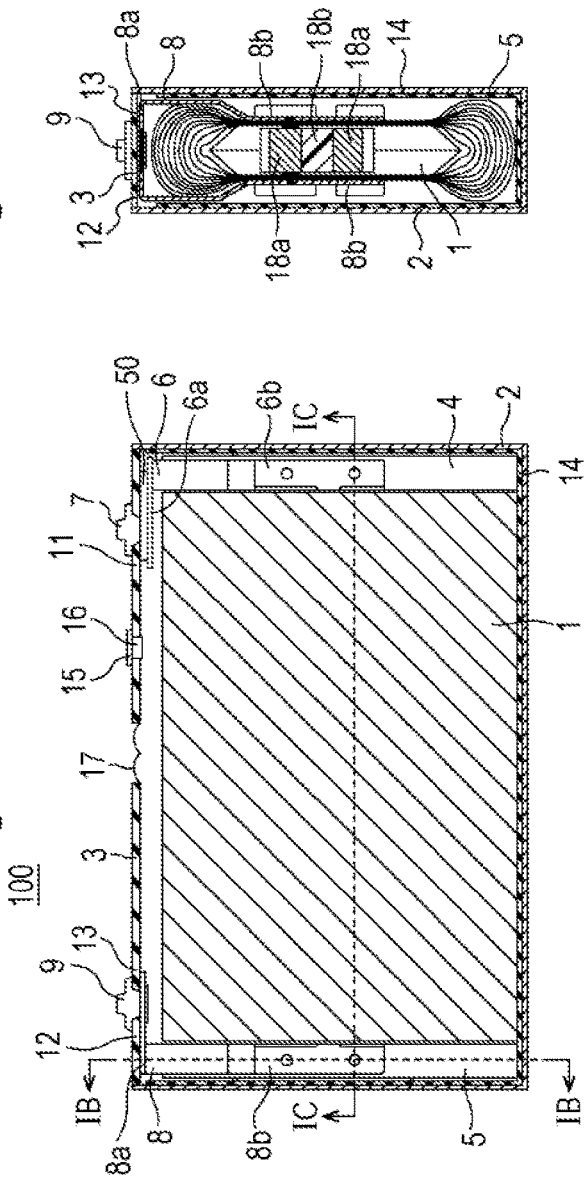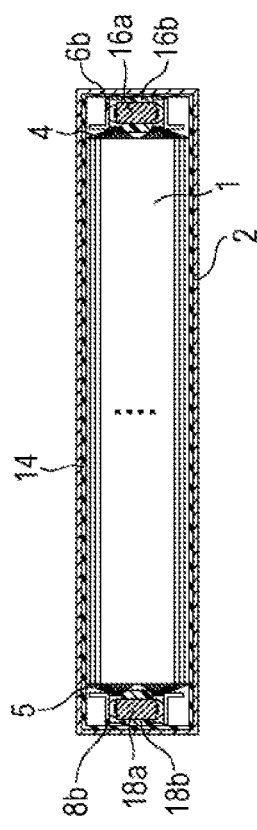

SECONDARY BATTERY

CROSS REFERENCE TO RELATED APPLICATIONS

The present invention application claims priority to Japanese Patent Application No. 2015-143912 filed in the Japan Patent Office on Jul. 21, 2015, the entire contents of which are incorporated herein by reference.

BACKGROUND OF THE INVENTION

Field of the Invention

The present invention relates secondary battery including a current interrupt mechanism.

Description of Related Art

Secondary batteries such as lithium-ion secondary batteries are used in stationary storage battery systems used for suppressing power variation of, for example, power sources for driving electric vehicles (EVs) and hybrid electric vehicles (HEV or PHEVs), photovoltaics, and wind power generation, or used for peak shift of system power that allows power to be stored during the nighttime and to be used during the daytime. A high capacity property and a high output property are required for use in EVs, HEVs, and PHEVs, and for stationary storage battery systems. Accordingly, the size of individual batteries has increased and many batteries are connected to each other in series or in parallel when used.

Batteries for such use are required to be significantly safer compared with secondary batteries for use in small portable equipment because materials having very high reactivity are used, particularly in the case where non-aqueous electrolyte secondary batteries are used. Accordingly, prismatic secondary batteries for the above use include a current interrupt mechanism that interrupts an electrical connection between an external terminal and an electrode body when the pressure inside a battery exterior body is increased as disclosed in, for example, Japanese Published Unexamined Patent Application No. 2008-66254 (Patent Document 1), Japanese Published Unexamined Patent Application No. 2008-66255 (Patent Document 2), Japanese Published Unexamined Patent Application No. 2010-212034 (Patent Document 3), Japanese Published Unexamined Patent Application No. 2013-175428 (Patent Document 4), Japanese Published Unexamined Patent Application No. 2013-157099 (Patent Document 5).

BRIEF SUMMARY OF THE INVENTION

An object of the present invention is to provide a secondary battery including a more reliable current interrupt mechanism.

A secondary battery according to an embodiment of the present invention includes an electrode body that includes a positive electrode sheet and a negative electrode sheet, a current collector that is connected to the positive electrode sheet or the negative electrode sheet, a prismatic exterior body that has an opening and contains the electrode body, a sealing plate that seals the opening, a terminal that is electrically connected to the current collector and that is attached to the sealing plate, a conductive member that has an opening portion on an electrode body side and that is disposed on a side nearer to the electrode body than the sealing plate, and a conductive deformable plate that seals the opening portion. The current collector is connected to a surface of the deformable plate on the electrode body side. A first insulating member is disposed between the deformable plate and the current collector. A second insulating member is disposed between the sealing plate and the conductive member, and the second insulating member is connected to the sealing plate. The first insulating member is connected to the current collector. The first insulating member includes a pair of first joints that are disposed so as to be aligned along a longitudinal direction of the sealing plate and a pair of second joints that are disposed so as to be aligned along a transverse direction of the sealing plate. The first joints and the second joints are connected to the second insulating member. When a pressure inside the battery is higher than or equal to a predetermined value, the deformable plate is deformed and a fragile portion is broken due to deformation of the deformable plate so that a conductive path between the positive electrode sheet or the negative electrode sheet and the terminal is disconnected.

With the above structure, the secondary battery includes a pressure-sensitive current interrupt mechanism and is hence reliable. The first insulating member and the second insulating member are connected to each other and the first insulating member and the current collector are connected to each other. This enables the fragile portion, which is a portion at which breakage is expected, disposed on the conductive path to be prevented from being damaged due to a load applied when the secondary battery is strongly impacted or vibrated. In the structure in which the first insulating member connected to the current collector is connected to the second insulating member connected to the sealing plate, a joint between the deformable plate and the current collector and a fragile portion disposed on the current collector or the deformable plate can be inhibited from being subjected to a load when the secondary battery is impacted or vibrated.

However, while developing a prismatic secondary battery including a more reliable current interrupt mechanism, the present inventors found the following.

As disclosed in, for example, Patent Document 1, a possible embodiment is that the first insulating member and the second insulating member are connected to each other only at both ends of the first insulating member in the transverse direction of the sealing plate. In such an embodiment, the reliability of the current interrupt mechanism can be improved. In such an embodiment, however, both ends of the first insulating member in the longitudinal direction of the sealing plate may be misaligned in the vertical direction with the joints between the first insulating member and the second insulating member at both ends of the first insulating member in the transverse direction of the sealing plate serving as fulcrums. In the case where the first insulating member is made of a relatively soft resin, the first insulating member may be deformed so as to bend in response to an impact or vibration and both ends of the first insulating member in the longitudinal direction of the sealing plate may be misaligned in the vertical direction.

The present inventors found that, when both ends of the first insulating member in the longitudinal direction of the sealing plate are inhibited or prevented from being moved slightly in the vertical direction, the joint between the deformable plate and the current collector and the fragile portion disposed on the current collector or the deformable plate can be inhibited from being subjected to a load and the operating pressure of the current interrupt mechanism can be stabilized.

The portion at which breakage is expected may be a fragile portion such as a thin portion or a groove formed on the current collector or the deformable plate. Alternatively, the portion at which breakage is expected may be the joint between the deformable plate and the current collector. The terminal may be directly attached to the sealing plate or may be attached thereto with an insulating member interposed therebetween.

The shapes of the first joints and second joints formed on the first insulating member are not particularly limited. The first joints and the second joints only need to have shapes suitable to be connected to the second insulating member. For example, the first joints and the second joints may include catch portions and the connection may be made in a manner in which the catch portions are caught on recessed portions formed on the upper surface of the second insulating member or a side wall of the second insulating member. Alternatively, the first joints and the second joints may include recessed portions, protruding portions may be disposed on the second insulating member, and the protruding portions of the second insulating member may be fitted into the recessed portions of the first joints and the second joints. The first joints and the second joints may have different shapes.

The first insulating member preferably includes a protrusion, and the current collector preferably includes a through-hole or a notch. The protrusion is preferably fitted into the through-hole or the notch so that the first insulating member is connected to the current collector.

The sealing plate, the second insulating member, and the conductive member are preferably integrally secured to each other. The first insulating member is preferably directly connected to the second insulating member.

The first insulating member is preferably directly connected to the conductive member.

An insulating member rotation preventing protrusion is preferably disposed on a surface of the first insulating member on a sealing plate side The second insulating member preferably includes a body that is disposed between the sealing plate and the conductive member, and a side wall that extends from the body toward the electrode body. The insulating member rotation preventing protrusion is preferably disposed on the side wall on an outer surface side.

BRIEF DESCRIPTION OF THE SEVERAL VIEWS OF THE DRAWINGS

FIG. 1A is a sectional view of a prismatic secondary battery according to an embodiment.

FIG. 1B is a sectional view of the prismatic secondary battery along line IB-IB in FIG. 1A.

FIG. 1C is a sectional view of the prismatic secondary battery along line IC-IC in FIG. 1A.

DETAILED DESCRIPTION OF THE INVENTION

Figure 2:
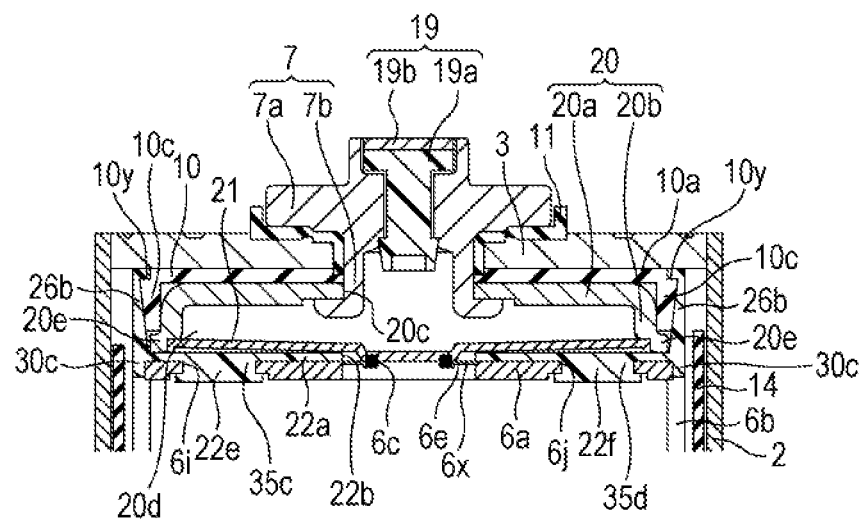
FIG. 2 is a sectional view of the prismatic secondary battery illustrated in FIGS. 1A to 1C viewed in the transverse direction of a seating plate of a current interrupt mechanism disposed on the positive electrode side of the prismatic secondary battery.

An embodiment of the present invention will be described below in detail. However, the present invention is not intended to be specified by the embodiment.

A prismatic secondary battery 100 according to the embodiment will be first described with reference to FIG. 1A to FIG. 1C. The prismatic secondary battery 100 includes a prismatic exterior body 2 having an opening at an upper portion thereof and a sealing plate 3 that seals the opening. The prismatic exterior body 2 and the sealing plate 3 constitute a battery case. The prismatic exterior body 2 and the sealing plate 3 are each made of a metal and preferably made of aluminum or an aluminum alloy. The prismatic exterior body 2 contains an electrolyte and a wound electrode body 1 that is flat and obtained by winding a positive electrode sheet and a negative electrode sheet with a separator interposed therebetween (these components are not shown in the figures). In the positive electrode sheet, a positive electrode active material mixture layer containing a positive electrode active material is formed on a metallic positive electrode core and a portion at which the positive electrode core is exposed is formed in the longitudinal direction. In the negative electrode sheet, a negative electrode active material mixture layer containing a negative electrode active material is formed on a metallic negative electrode core and a portion at which the negative electrode core is exposed is formed in the longitudinal direction. The positive electrode core is preferably made of aluminum or an aluminum alloy. The negative electrode core is preferably made of copper or a copper alloy.

The wound electrode body 1 includes, on one side in winding axis direction, an exposed positive electrode core portion 4 on which the positive electrode active material mixture layer is not formed and, on the other side in the winding axis direction, an exposed negative electrode core portion 5 on which the negative electrode active material mixture layer is not formed. A positive electrode current collector 6 is connected to the exposed positive electrode core portion 4. The positive electrode current collector 6 is electrically connected to a positive terminal 7. A negative electrode current collector 8 is connected to the exposed negative electrode core portion 5. The negative electrode current collector 8 is electrically connected to a negative terminal 9.

The positive electrode current collector 6 includes a base portion 6a that is disposed between the sealing plate 3 and the wound electrode body 1 and a pair of lead portions 6b extending from both ends of the base portion 6a toward the wound electrode body 1. The pair of the lead portions 6b are connected to the outer surface of the exposed positive electrode core portion 4 that is wound such that the exposed positive electrode core portion 4 that is wound is interposed between the pair of the lead portions 6b. The exposed positive electrode core portion 4 that is wound is divided into two pieces at the center of the positive electrode core in a direction in which layers of the positive electrode core are stacked. Two metallic positive electrode joint members 16a held by a positive electrode resin member 16b are disposed therebetween. The positive electrode current collector 6 is preferably made of aluminum or an aluminum alloy. The thickness of the positive electrode current collector 6 is preferably about 0.5 to 2 mm.

The negative electrode current collector 8 includes a base portion 8a that is disposed between the sealing plate 3 and the wound electrode body 1 and a pair of lead portions 8b extending from both ends of the base portion 8a toward the wound electrode body 1. The pair of the lead portions 8b are connected to the outer surface of the exposed negative electrode core portion 5 that is wound such that the exposed negative electrode core portion 5 that is wound is interposed between the pair of the lead portions 8b. The exposed negative electrode core portion 5 that is wound is divided into two pieces at the center of the negative electrode core in a direction in which layers of the negative electrode core are stacked. Two metallic negative electrode joint members 18a held by a negative electrode resin member 18b are disposed therebetween. The negative electrode current collector 8 is preferably made of copper or a copper alloy. The thickness of the negative electrode current collector 8 is preferably about 0.5 to 2 mm.

The positive terminal 7 is secured to the sealing plate 3 with an outer insulating member 11 interposed therebetween. The negative terminal 9 and the negative electrode current collector 8 are secured to the sealing plate 3 with an outer insulating member 13 and an inner insulating member 12 interposed therebetween, respectively. The positive terminal 7 is preferably made of a metal and is preferably made of aluminum or an aluminum alloy. The negative terminal 9 is preferably made of a metal and is preferably made of copper or a copper alloy.

The wound electrode body 1 is covered by an insulation seat 14 and contained in the prismatic exterior body 2. The sealing plate 3 is connected to the periphery of the opening of the prismatic exterior body 2 by welding such as laser welding. The sealing plate 3 includes an electrolytic solution injecting hole 15. The electrolytic solution injecting hole 15 is sealed by a sealing plug 16 after injection. A gas exhausting valve 7 through which gas is exhausted when the pressure inside the battery is higher than or equal to a predetermined value is formed in the sealing plate 3. A current interrupt mechanism 50 that operates and disconnects a conductive path when the pressure inside the battery is higher than or equal to a predetermined value is disposed on the conductive path between the positive electrode sheet and the positive terminal 7. The operating pressure of the current interrupt mechanism 50 is determined to be lower than the operating pressure of the gas exhausting valve 17.

Current Interrupt Mechanism

Figure 3:
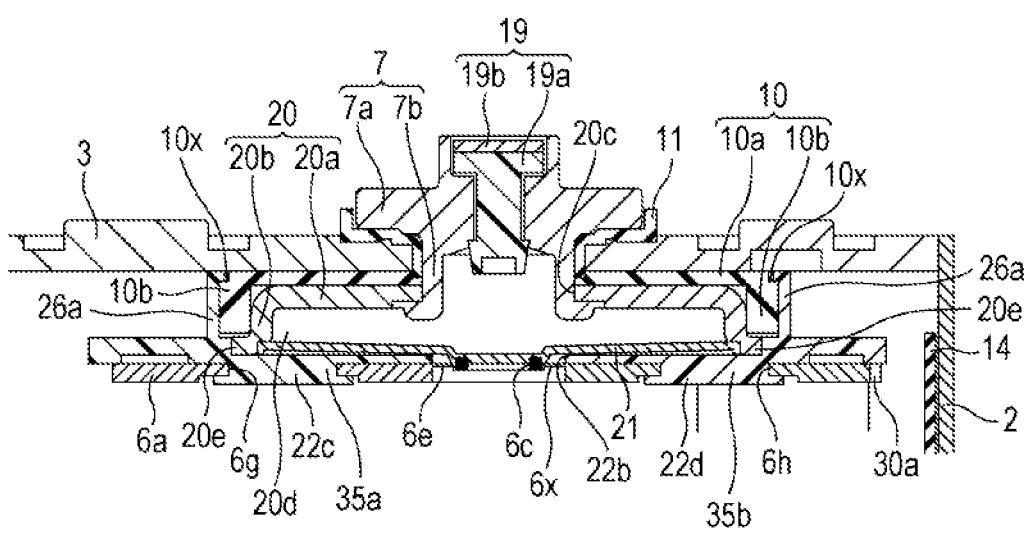
FIG. 3 is a sectional view of the prismatic secondary battery illustrated in FIGS. 1A to 1C viewed in the longitudinal direction of the sealing plate of the current interrupt mechanism disposed on the positive electrode side of the prismatic secondary battery.

The structure of the current interrupt mechanism 50 will be described with reference to FIG. 2 and FIG. 3. The positive terminal 7 includes a flange 7a that is disposed on the side nearer to the outside of the battery than the sealing plate 3 and an insertion portion 7b that is disposed on a surface of the flange 7a. The outer insulating member 11 is disposed on the surface of the sealing plate 3 on the outside of the battery. A second insulating member 10 is disposed on the surface of the sealing plate 3 on the inside of the battery and a conductive member 20 is disposed thereon. The insertion portion 7b of the positive terminal 7 is inserted from the outside of the battery into through-holes formed in the outer insulating member 11, the sealing plate 3, the second insulating member 10, and the conductive member 20. A tip of the insertion portion 7b is crimped on the conductive member 20. Thus, the positive terminal 7, the outer insulating member 11, the sealing plate 3, the second insulating member 10, and the conductive member 20 are integrally secured to each other.

The conductive member 20 made of a metal has a conductive member opening portion 20d on the side of the wound electrode body 1. The conductive member opening portion 20d of the conductive member 20 is sealed by a metallic deformable plate 21. The base portion 6a of the positive electrode current collector 6 is connected to the surface of the deformable plate 21 on the side of the wound electrode body 1. A first insulating member 22 is disposed between the deformable plate 21 and the base portion 6a of the positive electrode current collector 6. The first insulating member 22 includes a first body 22a disposed between the deformable plate 21 and the base portion 6a of the positive electrode current collector 6. A first through-hole 22b is formed in the first body 22a. The deformable plate 21 and the base portion 6a of the positive electrode current collector 6 are connected to each other via the first through-hole 22b.

In the base portion 6a of the positive electrode current collector 6, the periphery of a joint forming hole 6c is connected to the deformable plate 21 by welding. An annular thin region 6e is formed around the joint forming hole 6c. An annular groove 6x is formed on the thin region 6e so as to surround the joint forming hole 6c.

When the pressure inside the battery is higher than or equal to a predetermined value a central portion of the deformable plate 21 is deformed toward the sealing plate 3 and hence the annular groove 6x formed on the base portion 6a of the positive electrode current collector 6 is broken so that the conductive path between the positive electrode sheet and the positive terminal 7 is disconnected.

The components will now be described.

Second Insulating Member

Figure 4:
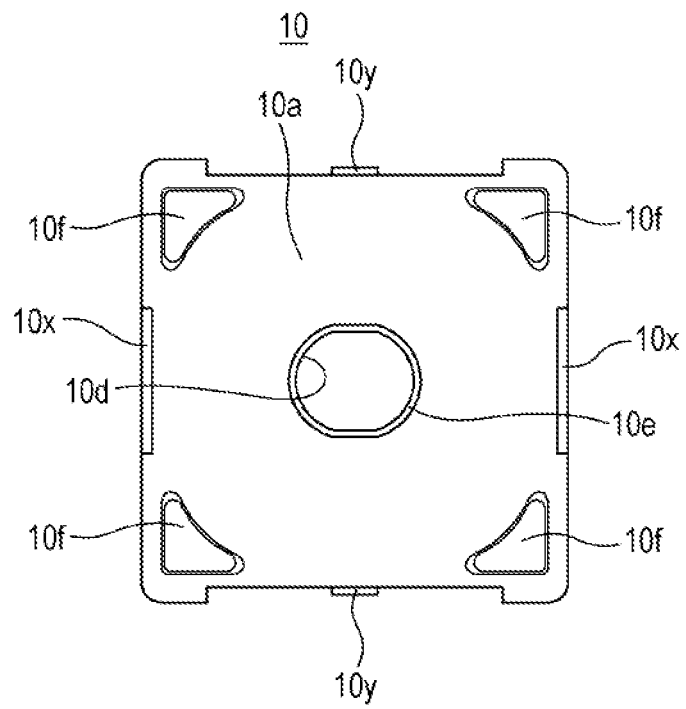
FIG. 4 is a top view of a second insulating member used in the prismatic secondary battery illustrated in FIG. 1A to 1C.
Figure 5:
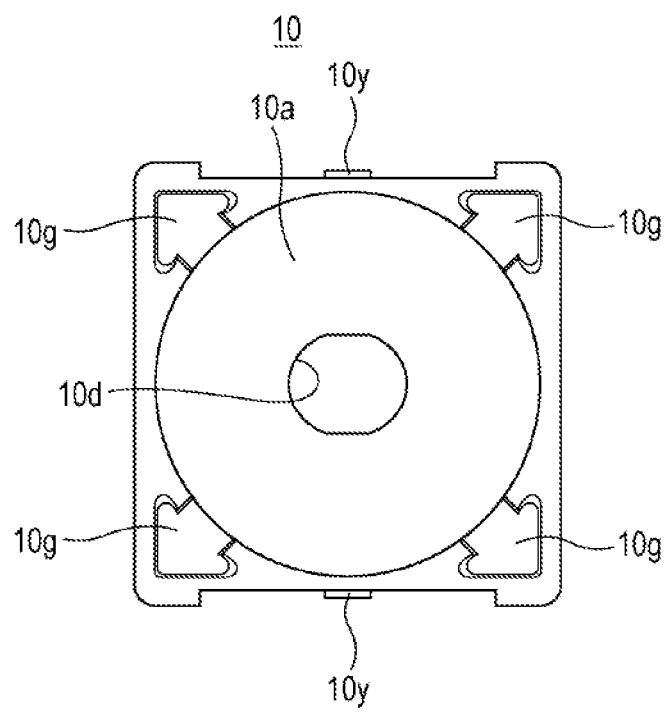
FIG. 5 is a bottom view of the second insulating member used in the prismatic secondary battery illustrated in FIGS. 1A to 1C.

FIG. 4 is a top view of the second insulating member 10 (surface on the side of the sealing plate 3). FIG. 5 is a bottom view of the second insulating member 10. The second insulating member 10 includes a second body 10a that is disposed between the sealing plate 3 and the conductive member 20. As illustrated in FIG. 3, a pair of first side walls 10b are formed on both ends of the second body 10a in the longitudinal direction of the sealing plate 3. As illustrated in FIG. 2, a pair of second side walls 10c are disposed on both ends of the second body 10a in the transverse direction of the sealing plate 3. First receiving portions 10x are formed on the first side walls 10b. Second receiving portions 10y are formed on the second side walls 10c. A second through-hole 10d is formed in the center of the second body 10a. The second through-hole 10d is formed into an oval shape so as to match the sectional shape of the insertion portion 7b of the positive terminal 7. A first thin portion 10e is disposed around the second through-hole 10d on the upper surface of the second body 10a. Second thin portions 10f are formed near four corners on the upper surface of the second body 10a. Third thin portions 10g are formed near the four corners on the lower surface of the second body 10a. Disposing the second thin portions 10f or the third thin portions 10g on the second body 10a enables bending of the second insulating member 10 to be suppressed. The second insulating member 10 is preferably made of a resin.

Conductive Member

The conductive member 20 includes a conductive member body 20a and a conductive member cylindrical portion 20b. The conductive member body 20a is disposed on the surface of the second body 10a of the second insulating member 10 on the side of the wound electrode body 1. A conductive member through-hole 20c is formed in the conductive member body 20a. The insertion portion 7b of the positive terminal 7 is inserted into the conductive member through-hole 20c. The conductive member cylindrical portion 20b is formed so as to extend from the outer circumferential edge of the conductive member body 20a toward the wound electrode body 1. The conductive member opening portion 20d is formed in the conductive member cylindrical portion 20b on the side of the wound electrode body 1. The conductive member opening portion 20d is sealed by the deformable plate 21. At the end of the conductive member cylindrical portion 20b on the side of the wound electrode body 1, a flange 20e that has an outer diameter larger than the outer diameter of an upper portion thereof is disposed. The conductive member is preferably made of a metal. In the case where the current interrupt mechanism is disposed on the positive electrode side, the conductive member is preferably made of aluminum or an aluminum alloy. The conductive member 20 is circular in plan view. However, a conductive member that is rectangular in plan view may be used as the conductive ember 20.

Deformable Plate

The deformable plate 21 that is conductive is preferably made of a metal. In particular, in the case where the current interrupt mechanism is disposed on the positive electrode side, the deformable plate 21 is preferably made of aluminum or an aluminum alloy. The deformable plate 21 is circular in plan view. The shape of the deformable plate 21 may be a shape that matches the shape of the conductive member opening portion 20d of the conductive member 20.

First Insulating Member

Figure 6:
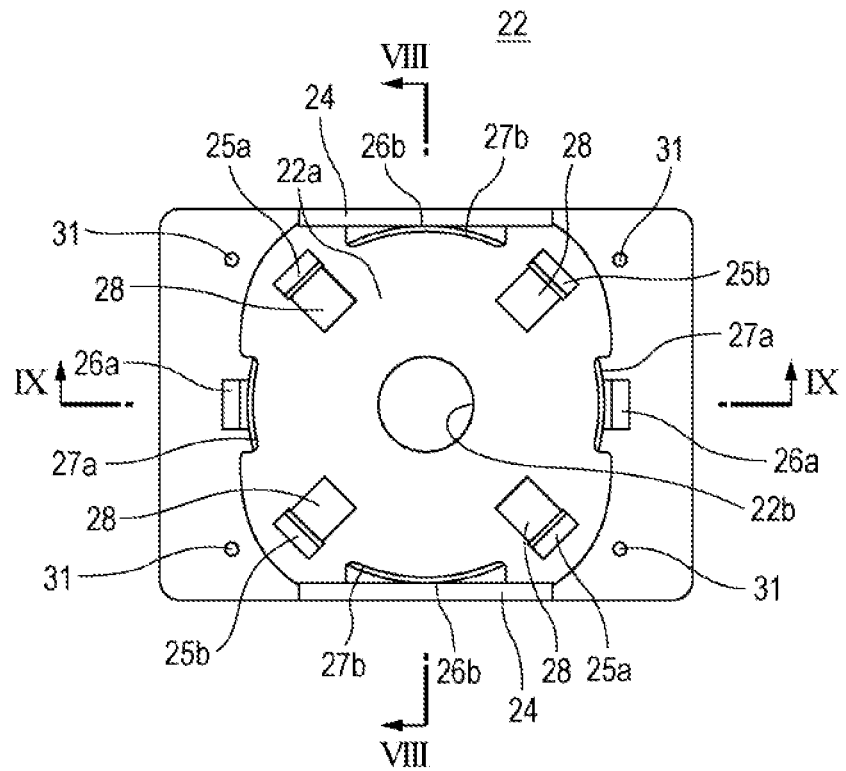
FIG. 6 is a top view of a first insulating member used in the prismatic secondary battery illustrated in FIGS. 1A to 1C.
Figure 7:
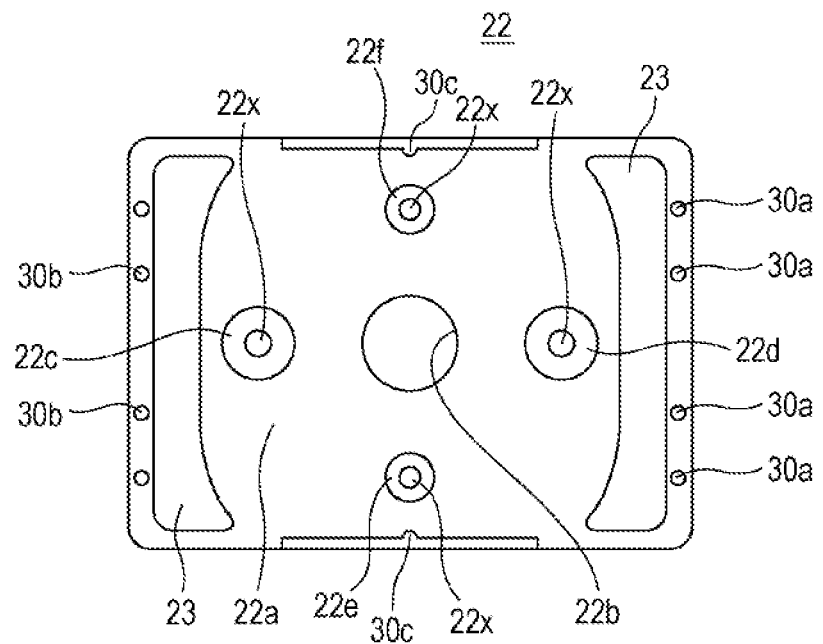
FIG. 7 is a bottom view of the first insulating member used in the prismatic secondary battery illustrated in FIGS. 1A to 1C.
Figure 8:
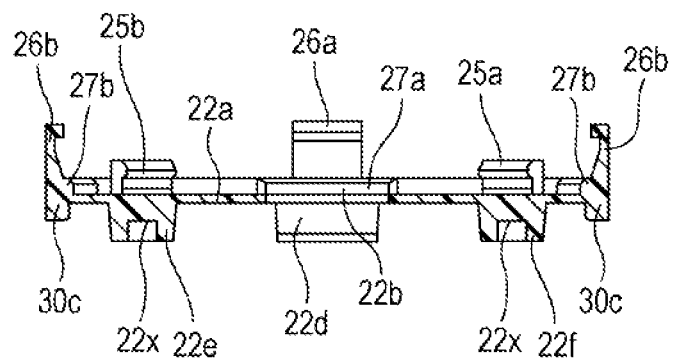
FIG. 8 is a sectional view of the first insulating member along VIII-VIII line in FIG. 6.
Figure 9:
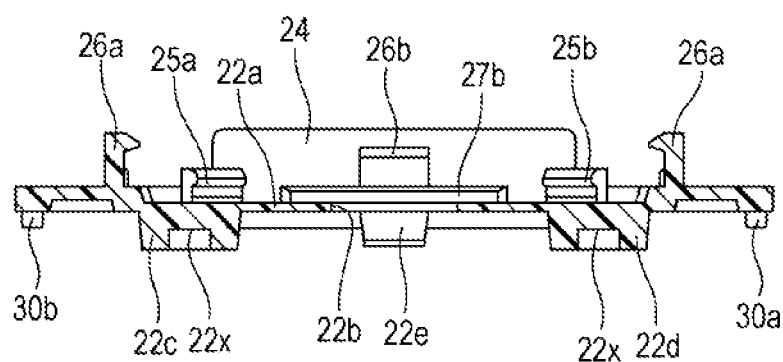
FIG. 9 is a sectional view of the first insulating member along IX-IX line in FIG. 6.

FIG. 6 is a top view of the first insulating member 22 (surface on the side of the sealing plate 3). FIG. 7 is a bottom view of the first insulating member 22. FIG. 8 is a sectional view of the first insulating member 22 along VIII-VIII line in FIG. 6. FIG. 9 is a sectional view of the first insulating member 22 along IX-IX line in FIG. 6.

The first insulating member 22 includes the first body 22a that is disposed between the deformable plate 21 and the base portion 6a of the positive electrode current collector 6. The first through-hole 22b is formed in the center of the first body 22a. The deformable plate 21 and the base portion 6a of the positive electrode current collector 6 are connected to each other via the first through-hole 22b.

As illustrated in FIG. 6, on the upper surface of the first body 22a of the first insulating member 22, a pair of third catch portions 25a are disposed so as to face each other with the first through-hole 22b interposed therebetween and a pair of fourth catch portions. 25b are disposed so as to face each other with the first through-hole 22b interposed therebetween. The third catch portions 25a and the fourth catch portions 25b are caught on the flange 20e of the conductive member 20. Thus, the first insulating member 22 is connected to the conductive member 20. On the upper surface of the first body 22a, protruding portions 28 are formed at the bottoms of the third catch portions 25a and the fourth catch portions 25b. Disposing the protruding portions 28 enables the conductive member 20 and the first insulating member 22 to be more firmly secured to each other in a catching manner and enables the first insulating member 22 to be more reliably prevented from being misaligned in the vertical direction with respect to the conductive member 20. It is to be noted that the protruding portions 28 are not essential components. The height of the protruding portions 28 may be very low, for example, from several micrometers to several tens of micrometers.

On the upper surface of the first body 22a of the first insulating member 22, a pair of first catch portions 26a are disposed so as to face each other with the first through-hole 22b interposed therebetween and a pair of second catch portions 26b are disposed so as to face each other with the first through-hole 22b interposed therebetween. The pair of the first catch portions 26a are disposed so as to be aligned in the longitudinal direction of the sealing plate 3. The pair of the second catch portions 26b are disposed so as to be aligned in the transverse direction of the sealing plate 3. The first catch portions 26a are caught on the first receiving portions 10x of the second insulating member 10. The second catch portions 26b are caught on the second receiving portions 10y of the second insulating member 10. Thus, the first insulating member 22 is connected to the second insulating member 10.

Insulating member rotation preventing protrusions 31 are disposed on the upper surface of the first body 22a of the first insulating member 22. The insulating member rotation preventing protrusions 31 are disposed on the outer surface side of the first side walls 10b of the second insulating member 10. The insulating member rotation preventing protrusions 31 are brought into contact with or caused to approach (for example, up to a distance of 1 mm or less) the respective first side walls 10b on the outer surface side, and the first insulating member 22 can thereby be more reliably prevented from being rotated in the horizontal direction with respect to the second insulating member 10. In the case where the insulating member rotation preventing protrusions 31 are caused to approach the respective first side walls 10b on the outer surface side, the shortest distance between the first side walls 10b and the insulating member rotation preventing protrusions 31 are preferably 1 mm or less, more preferably 0.5 mm or less. Although a plurality of the insulating member rotation preventing protrusions 31 are preferably disposed, the first insulating member 22 can be prevented from being rotated with respect to the second insulating member 10, provided that at least one insulating member rotation preventing protrusion 31 is disposed.

A pair of first pressing portions 27a and a pair of second pressing portions 27b are disposed on the upper surface of the first body 22a of the first insulating member 22. The pair of the first pressing portions 27a interpose the flange 20e of the conductive member 20 from both sides. Thus, the first insulating member 22 can be reliably prevented from being misaligned in the longitudinal direction of the sealing plate 3 with respect to the conductive member 20. The pair of the second pressing portions 27b interpose the flange 20e of the conductive member 20 from both sides. Thus, the first insulating member 22 can be reliably prevented from being misaligned in the transverse direction of the sealing plate 3 with respect to the conductive member 20. As illustrated in FIG. 6, the first pressing portions 27a or the second pressing portions 27b are preferably formed into a curved shape that matches the shape of the outer circumference of the conductive member 20.

A pair of third side walls 24 are disposed on the upper surface of the first body 22a of the first insulating member 22. The third side walls 24 are disposed on the outer surface side of the second side walls 10c of the second insulating member 10. In the first insulating member 22, parts of the third side walls 24 constitute he respective second catch portions 26b.

Figure 11:
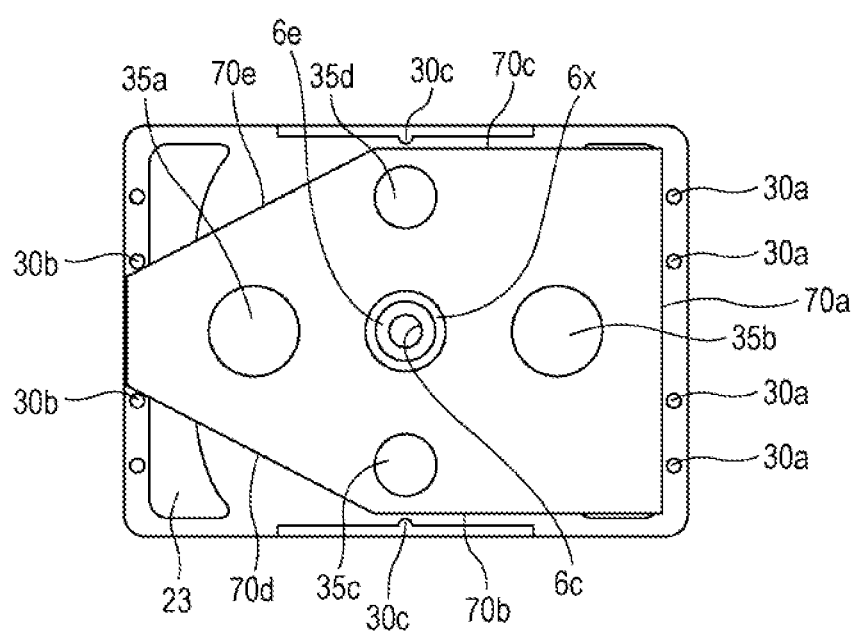
FIG. 11 is a bottom view of the first insulating member to which the current collector is attached.

As illustrated in FIG. 7, a first protrusion 22c, a second protrusion 22d, a third protrusion 22e, a fourth protrusion 22f are disposed on the lower surface of the first body 22a of the first insulating member 22. The first protrusion 22c, the second protrusion 22d, the third protrusion 22e, and the fourth protrusion 22f are inserted into a first opening 6g, a second opening 6h, a third opening 6i, and a fourth opening 6j formed in the base portion 6a of the positive electrode current collector 6, and the diameters of the tips thereof are increased by thermal crimping. As illustrated in FIG. 11, a first securing portion 35a, a second securing portion 35b, a third securing portion 35c, and a fourth securing portion 35d are consequently formed. Recessed portions 22x are preferably formed on the surfaces of the tips of the first protrusion 22c, the second protrusion 22d, the third protrusion 22e, and the fourth protrusion 22f before thermal crimping. Thus, the diameters of the first protrusion 22c, the second protrusion 22d, the third protrusion 22e, and the fourth protrusion 22f are more uniformly increased, and the first insulating member 22 and the base portion 6a of the positive electrode current collector 6 are more firmly secured to each other. In addition, even when the first insulating member 22 has a relatively high softening point or melting point, thermal crimping can be readily performed.

As illustrated in FIG. 7, first rotation preventing protrusions 30a, second rotation preventing protrusions 30b, and third rotation preventing protrusions 30c are disposed on the lower surface of the first body 22a of the first insulating member 22.

As illustrated in FIG. 11, in a state after the positive electrode current collector 6 is connected to the first insulating member 22, the first rotation preventing protrusions 30a, the second rotation preventing protrusions 30b and the third rotation preventing protrusions 30c are disposed outside outer circumferential edges of the base portion 6a of the positive electrode current collector 6. The first rotation preventing protrusions 30a, the second rotation preventing protrusions 30b, and the third rotation preventing protrusions 30c are disposed so as to be in contact with or approach the outer circumferential edges of the base portion 6a of the positive electrode current collector 6. In the case where the first rotation preventing protrusions 30a, the second rotation preventing protrusions 30b, and the third rotation preventing protrusions 30c are caused to approach the outer circumferential edges of the base portion 6a, the shortest distances between the outer circumferential edges of the base portion 6a and the first rotation preventing protrusions 30a, the second rotation preventing protrusions 30b, and third rotation preventing protrusions 30c are preferably 1 mm or less, more preferably 0.5 mm or less.

The first rotation preventing protrusions 30a are disposed so as to be in contact with or approach the outer circumferential edge of the base portion 6a of the positive electrode current collector 6 that is located outside the sealing plate 3 in the longitudinal direction of the sealing plate 3. The first rotation preventing protrusions 30a are formed along the outer circumferential edge of the base portion 6a of the positive electrode current collector 6 so as to be spaced apart from each other. A protrusion that is linear in plan view may be disposed instead of the first rotation preventing protrusions 30a. The diameter of the tip of each first rotation preventing protrusion 30a is smaller than or equal to the diameter of the bottom thereof.

The pair of the second rotation preventing protrusions 30b are disposed at positions at which the second rotation preventing protrusions 30b interpose a narrow region 6y formed on the base portion 6a of the positive electrode current collector 6 from both sides in the transverse direction of the sealing plate 3. The diameter of the tip of each second rotation preventing protrusion 30b is smaller than or equal to the diameter of the bottom thereof The pair of the third rotation preventing protrusions 30c are disposed at positions at which the third rotation preventing protrusions 30c interpose a wide region 6z of the base portion 6a of the positive electrode current collector 6 from both sides in the transverse direction of the sealing plate 3.

Disposing the rotation preventing protrusions on the lower surface of the first insulating member 22 enables the base portion 6a of the positive electrode current collector 6 to be prevented from being rotated in the horizontal direction with respect to the first insulating member. It is not necessary to dispose all of the first rotation preventing protrusions 30a, the second rotation preventing protrusions 30b, and the third rotation preventing protrusions 30c. However, at least two rotation preventing protrusions are preferably disposed. The two rotation preventing protrusions are preferably disposed so as to be each located outside two different outer circumferential edges of the base portion 6a of the positive electrode current collector 6. At least three rotation preventing protrusions are more preferably disposed in this case, the three rotation preventing protrusions are preferably disposed so as to be each located outside three different outer circumferential edges of the base portion 6a of the positive electrode current collector 6.

Fourth thin portions 23 are formed on the lower surface of the first body 22a of the first insulating member 22. Thus, the first body 22a of the first insulating member 22 can be prevented from being bent.

The first insulating member 22 has line symmetry with respect to a line that passes through the center of the first through-hole 22b and extends in the transverse direction of the sealing plate 3 (bilateral symmetry in FIG. 6 and FIG. 7). This enables assembly to be done without any problem even when the disposed component faces any direction.

Positive Electrode Current Collector

Figure 10A:
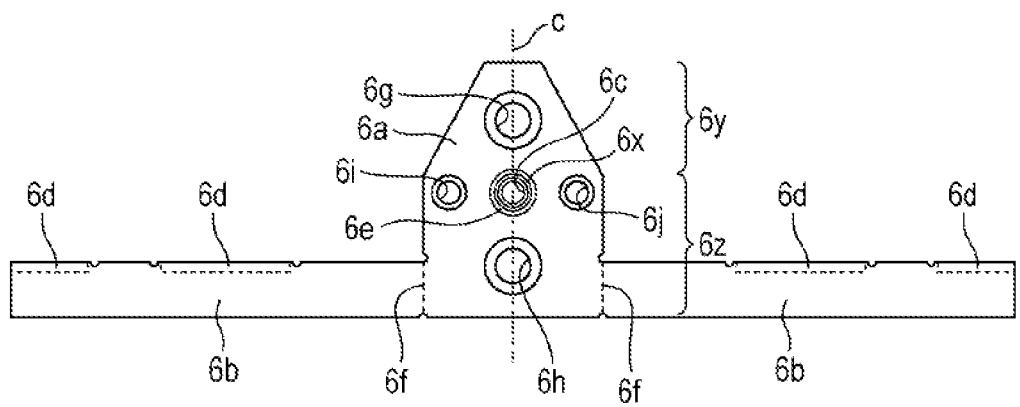
FIG. 10A is a front view of a positive electrode current collector used in the prismatic secondary battery illustrated in FIGS. 1A to 1C when the positive electrode current collector is
Figure 10B:
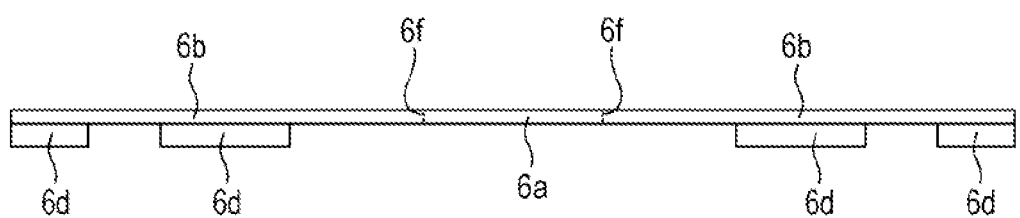
FIG. 10B is a side view of the positive electrode current collector

FIG. 10A is a diagram of the positive electrode current collector 6 unfolded and illustrates a surface thereof on the side of the wound electrode body 1. FIG. 10B is a side view of FIG. 10A, The positive electrode current collector 6 includes the base portion 6a in a plate shape that is disposed between the sealing plate 3 and the wound electrode body 1, and the pair of the lead portions 6b that extend from both ends of the base portion 6a toward the wound electrode body 1 and that are connected to the wound electrode body 1. The lead portions 6b are folded at folded portions 6f with respect to the base portion 6a.

Ribs 6d are disposed at edge portions of the lead portions 6b on the center side (upper side in FIG. 10A) of the wound electrode body in the width direction (vertical direction in FIG. 10A) of the lead portions 6b and at positions corresponding to portions of the lead portions 6b that are connected to the exposed positive electrode core portion 4. The joint forming hole 6c is formed in the base portion 6a. The base portion 6a is connected at the periphery of the joint forming hole 6c to the deformable plate 21 by, for example, laser welding. The thin region 6e is formed around the joint forming hole 6c. The annular groove 6x is formed on the thin region 6e so as to surround the joint forming hole 6c. The first opening 6g and the second opening 6h are formed on both sides of the joint forming hole 6c in the longitudinal direction of the sealing plate 3. The first opening 6g and the second opening 6h are aligned along a line c that passes through the center of the joint forming hole 6c and extends in the longitudinal direction of the sealing plate 3. The third opening 6i and the fourth opening 6j are formed on both sides of the joint forming hole 6c in the transverse direction of the sealing plate 3. In the base portion 6a, the narrow region 6y that is narrower than the wide region 6z (width in the transverse direction of the sealing plate 3) is formed on the center side of the sealing plate 3 in the longitudinal direction of the sealing plate 3. The lead portions 6b are disposed in the wide region 6z.

Procedure of Assembly of Conductive Path

A method of assembling a positive electrode conductive path will now be described.

The outer insulating member 11 is disposed on the sealing plate 3 on the outside of the battery. The second insulating member 10 is disposed on the sealing plate 3 on the inside of the battery and the conductive member 20 is disposed thereon. The insertion portion 7b of the positive terminal 7 is inserted from the outside of the battery into the through-holes formed in the outer insulating member 11, the sealing plate 3, the second insulating member 10, and the conductive member 20. A tip of the insertion portion 7b is crimped on the conductive member 20. Thus, the positive terminal 7, the outer insulating member 11, the second insulating member 10, and the conductive member 20 are integrally secured to each other. The tip of the insertion portion 7b is preferably welded to the conductive member 20 by laser welding.

The conductive member opening portion 20d of the conductive member 20 on the side of the wound electrode body 1 is subsequently closed by the deformable plate 21. The outer circumferential edge of the deformable plate 21 are welded to the flange 20e of the conductive member 20 by laser welding. Thus, the conductive member opening portion 20d is sealed.

The first protrusion 22e, second protrusion 22d, third protrusion 22e, and fourth protrusion 22f of the first insulating member are subsequently inserted into the first opening 6g, the second opening 6h, the third opening 6i, and the fourth opening 6j that are formed in the base portion 6a of the positive electrode current collector 6, respectively. The diameters of the tips of the first protrusion 22c, second protrusion 22d, third protrusion 22e, and fourth protrusion 22f of the first insulating member 22 are increased by thermal crimping so that the first securing portion 35a, the second securing portion 35b, the third securing portion 35c and the fourth securing portion 35d are formed. Thus, the positive electrode current collector 6 is connected to the first insulating member 22. At least one securing portion needs to be formed between the positive electrode current collector 6 and the first insulating member 22. At least two securing portions are preferably formed. At least three securing portions are more preferably formed. It is further preferable for the three securing portions not to be aligned.

The first insulating member 22 to whirl the positive electrode current collector 6 is connected is subsequently connected to the second insulating member 10. Specifically, the connection is made in a manner in which the first catch portions 26a and second catch portions 26b of the first insulating member 22 are caught on the first receiving portions 10x and second receiving portions 10y of the second insulating member 10, respectively, and the third catch portions 25a and fourth catch portions 25b of the first insulating member are caught on the flange 20e of the conductive member 20. Thus, the first insulating member is directly connected to the conductive member 20.

Gas is subsequently delivered from the outside of the battery into the through-hole formed in the positive terminal 7 to bring the deformable plate 21 into close contact with the base portion 6a of the positive electrode current collector 6. The deformable plate 21 is connected to the base portion 6a of the positive electrode current collector 6 by laser welding. The periphery of the joint forming hole 6c formed in the base portion 6a of the positive electrode current collector 6 is welded to the deformable plate 21.

Thus, the conductive path of the positive electrode current collector 6—the deformable plate 21—the conductive member 20—the positive terminal 7 is formed. The through-hole formed the positive terminal 7 is sealed by a terminal plug 19. The terminal plug 19 includes an elastic portion 19a and a metallic portion 19b.

A negative electrode conductive path is assembled by the following manner.

The outer insulating member 13 is disposed on the sealing plate 3 on the outside of the battery. The inner insulating member 12 is disposed on the sealing plate 3 on the inside of the battery and the base portion 8a of the negative electrode current collector 8 is disposed thereon. The insertion portion of the negative terminal 9 is inserted into the through-holes formed in the outer insulating member 13, the sealing plate 3, the inner insulating member 12, and the base portion 8a of the negative electrode current collector 8. A tip of the insertion portion of the negative terminal 9 is crimped on the base portion 8a of the negative electrode current collector 8. Thus, the negative terminal 9, the outer insulating member 13, the sealing plate 3, the inner insulating member 12, and the negative electrode current collector 8 are integrally secured to each other. The tip of the insertion portion is preferably welded to the base portion 8a of the negative electrode current collector 8 by laser welding.

Manufacture of Wound Electrode Body

A method of manufacturing, the wound electrode body 1 will now be described. A positive electrode mixture containing lithium cobalt oxide ($LiCoO_2$) as the positive electrode active material, a conductive agent, and a binder is applied to both surfaces of a rectangular aluminum foil with a thickness of 15 μm as the positive electrode core so that the positive electrode active material mixture layer is formed. The positive electrode sheet is manufactured so as to include, at one short side, the exposed positive electrode core portion on which the positive electrode active material mixture is not formed within a predetermined width. A negative electrode mixture containing natural graphite powder as the negative electrode active material and a binder is applied to both surfaces of a rectangular copper foil with a thickness of 8 μm as the negative electrode core so that the negative electrode active material mixture layer is formed. The negative electrode sheet is manufactured so as to include, at one short side, the exposed negative electrode core portion on which the negative electrode active material mixture is not formed within a predetermined width.

A porous separator made of polyethylene is interposed between the positive electrode sheet and the negative electrode sheet thus obtained such that the exposed positive electrode core portion of the positive electrode sheet and the exposed negative electrode core portion of the negative electrode sheet do not overlap the opposing active material mixture layers of electrodes. The sheets and the separator are wound and then formed into a flat shape. Thus, the wound electrode body 1 is manufactured into a flat shape such that the exposed positive electrode core portion 4, at which a plurality of the positive electrode cores are stacked, is disposed at one end thereof and the exposed negative electrode core portion 5, at which a plurality of the negative electrode cores are stacked, is disposed at the other end thereof.

Assembly of Battery

The positive electrode current collector 6 and the negative electrode current collector 8 that are connected to the sealing plate 3 are connected to the exposed positive electrode core portion 4 and exposed negative electrode core portion 5 of the wound electrode body 1, respectively. The wound electrode body 1 is wrapped with the insulation seat 14 that is bent into the form of a box. The wound electrode body 1 is inserted into the prismatic exterior body 2. The sealing plate 3 is then welded to the prismatic exterior body 2 by laser welding to seal the opening of the prismatic exterior body 2 by the sealing plate 3. A non-aqueous electrolyte containing an electrolyte solvent and an electrolyte salt is poured from the electrolytic solution injecting hole 15. The electrolytic solution injecting hole 15 is sealed by the sealing plug 16 so that the prismatic secondary battery 100 is obtained.

Prismatic Secondary Battery 100

While developing a current interrupt mechanism, the present inventors found that the base portion 6a of the positive electrode current collector 6 may be misaligned so as to be rotated in the horizontal direction with respect to the first insulating member 22 even when the base portion 6a of the positive electrode current collector 6 is connected to the first insulating member 22. Such a problem is likely to occur when the first insulating member 22 is made of a relatively soft resin. The present inventors found that the above problem can be solved in a manner in which a rotation preventing protrusion is disposed on the lower surface of the first insulating member 22 and outside an outer circumferential edge of the base portion 6a of the positive electrode current collector 6.

In the prismatic secondary battery 100, the rotation preventing protrusions are formed on the lower surface of the first body 22a of the first insulating member 22 in addition to the joint between the first insulating member 22 and the base portion 6a of the positive electrode current collector 6. Accordingly, the above problem can be solved.

As illustrated in FIG. 11, the outer circumferential edges of the base portion 6a of the positive electrode current collector 6 include a rectilinear first end side portion 70a, a rectilinear second end side portion 70b, a rectilinear third end side portion 70c, a rectilinear fourth end side portion 70d, and a rectilinear fifth end side portion 70e that are not aligned. The first rotation preventing protrusions 30a are disposed outside the first end side portion 70a. One of the third rotation preventing protrusions 30c is disposed outside the second end side portion 70b. The other thud rotation preventing protrusion 30c is disposed outside the third end side portion 70c. One of the second rotation preventing protrusions 30b is disposed outside the fourth end side portion 70d. The other second rotation preventing protrusion 30b is disposed outside the fifth end side portion 70e.

In order to more reliably prevent the base portion 6a of the positive electrode current collector 6 from being moved so as to be rotated in the horizontal direction with respect to the first insulating member 22, the base portion 6a of the positive electrode current collector 6 preferably includes at least two different rectilinear end side portions and the rotation preventing protrusions are preferably disposed outside the respective two end side portions. In addition, the base portion 6a of the positive electrode current collector 6 preferably includes at least three different rectilinear end side portions and the rotation preventing protrusions are preferably disposed outside the respective three end side portions.

A recessed portion may be formed on one of the rectilinear end side portions and one of the rotation preventing protrusions may be fitted into the recessed portion.

The first insulating member 22 includes the pair of the first catch portions 26a and the pair of the second catch portions 26b. The pair of the first catch portions 26a and the pair of the second catch portions 26b are connected to the second insulating member 10.

Possible positions at which the first insulating member 22 is connected to the second insulating member 10 are both ends thereof in the transverse direction of the sealing plate 3. That is, a possible structure is that the pair of the second catch portions 26b are disposed on both ends of the first insulating member 22 in the transverse direction of the sealing plate 3 and the pair of the first catch portions 26a are not disposed on both ends of the first insulating member 22 in the longitudinal direction of the sealing plate 3. In such a structure, both ends of the first insulating member 22 in the longitudinal direction of the sealing plate 3 may be misaligned in the vertical direction with the joints between the second catch portions 26b of the first insulating member 22 and the second insulating member 10 serving as fulcrums. In the case where the first insulating member 22 is made of a relatively soft resin, the first insulating member 22 may be deformed so as to bend in response to an impact or vibration and both ends of the first insulating member 22 in the longitudinal direction of the sealing plate 3 may be misaligned in the vertical direction.

In contrast, in the case where the pair of the first catch portions 26a and the pair of the second catch portions 26b are disposed on the first insulating member 22 and the pair of the first catch portions 26a and the pair of the second catch portions 26b are connected to the second insulating member 10, both ends of the first insulating member 22 in the longitudinal direction of the sealing plate 3 can be reliably prevented from being misaligned in the vertical direction.

The first insulating member and the second insulating member are preferably made of a resin. Examples of the materials of the first insulating member and the second insulating member include polypropylene, polyethylene, polyphenylene sulfide, polyetheretherketone, polycarbonate, tetrafluoroethylene perfluoroalkyl ethylene, and a copolymer of tetrafluoroethylene and perfluoroalkyl ethylene. In particular, polypropylene is preferable. The present invention is particularly effective when the first insulating member is made of a relatively soft resin. In the case where the first insulating member is made of polypropylene or a resin having a flexural modulus (ASTM D790) lower than the flexural modulus of polypropylene, for example, the present invention is particularly effective. In the ease where the first insulating member has a flexural modulus (ASTM D790) of 5 GPa or less, the present invention is particularly effective in the case where the first insulating member has a flexural modulus (ASTM D790) of 2 GPa or less, the present invention is more particularly effective. In the case where the first insulating member is made of a relatively soft resin, the current interrupt mechanism is readily installed and the first insulating member can be reliably prevented from being damaged during the installation. The first insulating member and the second insulating member may be made of different materials.

The first insulating member is preferably transparent. When the first insulating member is transparent for example, a state of a connection between the conductive member 20 and the deformable plate 21 can be checked by seeing through the first securing portion 35a or the second securing portion 35b.

In an example of the prismatic secondary battery 100 the current interrupt mechanism is disposed on the positive electrode conductive path. The current interrupt mechanism, however, may be disposed on the negative electrode conductive path.

In an example of the prismatic secondary battery 100, the first insulating member 22 is directly connected to the conductive member 20 by using the third catch portions 25a and the fourth catch portions 25b. The third catch portions 25a and the fourth catch portions 25b, however, are not essential components. It is not necessary for the first insulating member 22 to be directly connected to the conductive member 20. In the prismatic secondary battery 100, the second insulating member 10 is integrally secured to the conductive member 20 by using the positive terminal 7. The first insulating member 22 is directly connected to the second insulating member 10 by using the first catch portions 26a or the second catch portions 26b. For this reason, the positive electrode current collector 6 is connected to the deformable plate 21 at a portion other than the joint between the deformable plate 21 and the base portion 6a with the first insulating member 22, the second insulating member 10, and the conductive member 20 interposed therebetween. Accordingly, loads on the fragile portion and the joint between the deformable plate 21 and the base portion 6a are decreased. In order to further decrease the loads on the fragile portion and the joint between the deformable plate 21 and the base portion 6a, the first insulating member 22 is preferably directly connected to the conductive member 20.

In the case where the first insulating member 22 is directly connected to the conductive member 20, the first insulating member 22 may not be directly connected to the second insulating member 10. In order to further decrease the loads on the fragile portion and the joint between the deformable plate 21 and the base portion 6a, however, the first insulating member 22 is preferably directly connected to the second insulating member 10 and the first insulating member 22 is preferably directly connected to the conductive member 20.

In an example of the prismatic secondary battery 100, the first catch portions 26a of the first insulating member 22 are connected to the first receiving portions 10x disposed on the second insulating member 10 on the upper surface side and the second catch portions 26b of the first insulating member 22 are connected to the second receiving portions 10y disposed on the second insulating member 10 on the upper surface side.

However, recessed portions may be formed at central portions or lower portions of the first side walls 10b and second side walls 10c of the second insulating member 10 in the vertical direction (direction perpendicular to the sealing plate 3) and the recessed portions may serve as the first receiving portions 10x or the second receiving portions 10y.

In a method of connecting the first insulating member 22 to the second insulating member 10, connecting protruding portions may be disposed on the outer surfaces of the first side walls 10b or second side walls 10c of the second insulating member 10 and joints including receiving portions each having a shape suitable to fit each of the connecting protruding portions of the second insulating member 10 into the corresponding receiving portion may be disposed on the first insulating member 22. For example, the recessed portions may be disposed on the third side walls 24 of the first insulating member 22 on the inner surface side and the connecting protruding portions of the second insulating member 10 may be fitted into the recessed portions.

In an example of the prismatic secondary battery 100, the wound electrode body is used. The structure of the electrode body, however, is not particularly limited. For example, a stack-type electrode body in which plural positive electrode sheets and plural negative electrode sheets are stacked with separators interposed therebetween may be used.

In an example of the prismatic secondary battery 100, the terminal and the conductive member are different components. The terminal and the conductive member, however, may be an integral component. In this case, the terminal may be inserted from the inside of the battery into a through-hole formed in the sealing plate, and a tip of the terminal may be crimped on the sealing plate on the outer surface side.

Any one of positive electrode active materials, negative electrode active materials and non-aqueous electrolytes that are generally used in non-aqueous electrolyte secondary batteries may be used.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body that includes a positive electrode sheet and a negative electrode sheet;
a current collector that is connected to the positive electrode sheet or the negative electrode sheet;
a prismatic exterior body that has an opening and contains the electrode body;
a sealing plate that seals the opening;
a terminal that is electrically connected to the current collector and that is attached to the sealing plate;
a conductive member that has an opening portion on an electrode body side and that is disposed on a side nearer to the electrode body than the sealing plate; and
a conductive deformable plate that seals the opening portion,
wherein the current collector is connected to a surface of the deformable plate on the electrode body side,
wherein a first insulating member is disposed between the deformable plate and the current collector,
wherein a second insulating member is disposed between the sealing plate and the conductive member, and the second insulating member is connected to the sealing plate,
wherein the first insulating member is connected to the current collector,
wherein the first insulating member includes a pair of first joints that are disposed so as to be aligned along a longitudinal direction of the sealing plate, and a pair of second joints that are disposed so as to be aligned along a transverse direction of the sealing plate,
wherein the first joints and the second joints are connected to the second insulating member, and
wherein, when a pressure inside the battery is higher than or equal to a predetermined value, the deformable plate is deformed and a fragile portion is broken due to deformation of the deformable plate so that a conductive path between the positive electrode sheet or the negative electrode sheet and the terminal is disconnected.

2. The secondary battery according to claim 1,
wherein the first insulating member includes a protrusion, and the current collector includes a through-hole or a notch, and
wherein the protrusion is fitted into the through-hole or the notch so that the first insulating member is connected to the current collector.

3. The secondary battery according to claim 1,
wherein the sealing plate, the second insulating member, and the conductive member are integrally secured to each other, and
wherein the first insulating member is directly connected to the second insulating member.

4. The secondary battery according to claim 1,
wherein the first insulating member is directly connected to the conductive member.

5. The secondary battery according to claim 1,
wherein an insulating member rotation preventing protrusion is disposed on a surface of the first insulating member on a sealing plate side,
wherein the second insulating member includes a body that is disposed between the sealing plate and the conductive member, and a side wall that extends from the body toward the electrode body, and
wherein the insulating member rotation preventing protrusion is disposed on the side wall on an outer surface side.

6. The secondary battery according to claim 1, wherein the first joints and the second joints are directly connected to the second insulating member.

7. The secondary battery according to claim 1,
wherein the first insulating member has a first edge portion at one edge and a second edge portion at the other edge along the longitudinal direction of the sealing plate,
wherein the first insulating member has a third edge portion at one edge and a fourth edge portion at the other edge along the transverse direction of the sealing plate,
wherein one of the first joints is located at a position apart from the third edge portion toward the fourth edge portion, and the other of the first joints is located at a position apart from the fourth edge portion toward the third edge portion, and
wherein one of the second joints is located at the first edge portion, and the other of the first joints is located at the second edge portion.

8. The secondary battery according to claim 1, wherein the first insulating member comprises third joints that are provided apart from the first joints and the second joints, and are directly connected to the conducting member.

9. The secondary battery according to claim 8, wherein, in the sectional view of the first insulating member, height of each of the first joints and height of each of the second joints are each higher than height of each of the third joints.

10. The secondary battery according to claim 8, wherein the first insulating member comprises a body from which the first joints, the second joints and the third joints protrude toward the sealing plate in the sectional view of the first insulating member, and
wherein, in the sectional view of the first insulating member, height of each of the first joints and height of each of the second joints are each higher than height of each of the third joints.

11. The secondary battery according to claim 8,
wherein the first insulating member comprises first pressing portions that press the conductive member,
wherein, in the top view of the first insulating member, the conductive member has a curved shape in the outer circumference, and
wherein, in the top view of the first insulating member, the first pressing portions each have a curved shape that matches the shape of the conductive member.

12. The secondary battery according to claim 11,
wherein the first insulating member comprises a body from which the first joints protrude toward the sealing plate in the sectional view of the first insulating member, and
wherein the first pressing portions are formed at the root of the first joints in the top view of the first insulating member.

13. The secondary battery according to claim 12, wherein the first joints are directly connected to the second insulating member.

14. The secondary battery according to claim 12,
wherein the first insulating member comprises second pressing portions that press the conductive member,
wherein, in the top view of the first insulating member, the second pressing portions each have a curved shape that matches the shape of the conductive member.

15. The secondary battery according to claim 14,
wherein the second pressing portions protrude from the body toward the sealing plate in the sectional view of the first insulating member, and
wherein the second pressing portions are formed at the root of the second joints in the top view of the secondary battery.

16. The secondary battery according to claim 8,
wherein the first insulating member comprises a body from which the first joints, the second joints and the third joints protrude toward the sealing plate in the sectional view of the first insulating member,
wherein the body has a recess on the surface that faces the sealing plate,
wherein the third joints are disposed in the recess, and
wherein the first joints are disposed outside the recess.

17. The secondary battery according to claim 1,
wherein the first insulating member comprises a body from which the first joints and the second joints protrude toward the sealing plate in the sectional view of the first insulating member,
wherein the first insulating member comprises a pair of insulating member rotation preventing protrusions that protrude from the body toward the sealing plate in the sectional view of the first insulating member,
wherein the pair of insulating member rotation preventing protrusions are disposed so as to be aligned along a longitudinal direction of the sealing plate, and
wherein the first joints are disposed between the pair of insulating member rotation preventing protrusions.

* * * * *